US 7,408,739 B2

(12) United States Patent  (10) Patent No.: US 7,408,739 B2
Kim et al.  (45) Date of Patent: Aug. 5, 2008

(54) HARD DISK DRIVE WITH DISK SPACER AND SPINDLE MOTOR ASSEMBLY

(75) Inventors: Kwang-kyu Kim, Yongin-si (KR); Woo-sung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 296 days.

(21) Appl. No.: 11/334,514

(22) Filed: Jan. 19, 2006

(65) Prior Publication Data

US 2006/0158777 A1   Jul. 20, 2006

(30) Foreign Application Priority Data

Jan. 19, 2005   (KR) .................. 10-2005-0005072

(51) Int. Cl.
*G11B 17/08*   (2006.01)
(52) U.S. Cl. .................................. 360/98.08
(58) Field of Classification Search ........................ None
See application file for complete search history.

(56) References Cited

U.S. PATENT DOCUMENTS

| 5,272,581 | A | * | 12/1993 | Kojima et al. | 360/98.01 |
|---|---|---|---|---|---|
| 5,638,233 | A | * | 6/1997 | Ishizuka | 360/99.09 |
| 5,875,171 | A | * | 2/1999 | Albrecht et al. | 369/281 |
| 6,040,957 | A | * | 3/2000 | Konings | 360/98.08 |
| 6,064,547 | A | | 5/2000 | Wittig et al. | |
| 6,285,525 | B1 | | 9/2001 | McCutcheon et al. | |
| 6,414,817 | B1 | * | 7/2002 | Luo et al. | 360/98.08 |
| 6,456,455 | B2 | | 9/2002 | McCutcheon et al. | |
| 2004/0100725 | A1 | | 5/2004 | Chen et al. | |
| 2006/0232880 | A1 | * | 10/2006 | Xu et al. | 360/99.12 |

FOREIGN PATENT DOCUMENTS

KR   10-2004-0045302 A   6/2004

OTHER PUBLICATIONS

Korean Intellectual Property Office Notice to Submit Response Issued May 19, 2006.

* cited by examiner

*Primary Examiner*—Angel A Castro
(74) *Attorney, Agent, or Firm*—Staas & Halsey LLP

(57) ABSTRACT

A hard disk drive (HDD) having a spindle motor, at least one data storage disk, a disk clamp fastened to the spindle motor and fixing the disk to the spindle motor, and at least one disk spacer mounted on the spindle motor to support the disk. The disk spacer includes a ring-shaped disk spacer body fitted around an outer circumference of the spindle motor with at least one surface contacting the disk, a first groove on the surface of the spacer body contacting the disk, a second groove on the surface of the spacer body contacting the disk to extend along both sides of the first groove, and a damping member between the spacer body and the disk to reduce vibrations of the disk, seated in the first groove in a normal state and compressed by the disk, a portion of which is deformed and accommodated in the second groove.

15 Claims, 5 Drawing Sheets

HARD DISK DRIVE WITH DISK SPACER AND SPINDLE MOTOR ASSEMBLY

CROSS-REFERENCE TO RELATED APPLICATIONS

This application claims the priority benefit of Korean Patent Application No. 10-2005-0005072, filed on Jan. 19, 2005, in the Korean Intellectual Property Office, the disclosure of which is incorporated herein in its entirety by reference.

BACKGROUND OF THE INVENTION

1. Field of the Invention

Embodiments of the present invention relate to a hard disk drive, and more particularly, to a hard disk drive having a disk spacer supporting information storage disks and a spindle motor including the disk spacer.

2. Description of the Related Art

Hard disk drives (HDDs), which may store information for computers, read and/or write data inform/to a disk using a read/write head. In HDDs, the read/write head may operate by being moved to a desired position while flying at a predetermined height above a surface of the disk.

FIG. 1 illustrates a conventional HDD, with FIG. 2 illustrating a spindle motor, disks, a spacer, and a clamp coupled to one another in a HDD, such as the conventional HDD of FIG. 1.

Referring to FIGS. 1 and 2, a spindle motor 30 may rotate disks 21 and 22, which are data-storage recording media, and an actuator 40 may move a read/write head over any of the disks 21 and 22 for data reproduction and/or recording from a desired portion of the disks 21 and 22. As illustrated, disks 21 and 22 may further be installed on a base member 11 of the HDD.

While the two disks 21 and 22 may be mounted on the spindle motor 30, as shown in FIGS. 1 and 2, a single disk, or even additional disks may be mounted on the spindle motor 30. When the plurality of disks 21 and 22 are mounted on the spindle motor 30, a ring-shaped disk spacer 50 may be used to maintain a distance between the disks 21 and 22. The disk spacer 50 can be fitted around an outer circumference of a hub 32 of the spindle motor 30, to be interposed between the disks 21 and 22. A clamp 55 may be used to firmly fix the disks 21 and 22 to the spindle motor 30, with the clamp 55 being coupled to an upper portion of the spindle motor 30 using clamp fastening screws 56.

The actuator 40 may include a swing arm 42 rotatably coupled to a pivot shaft 41 installed on the base member 11, a suspension 43 installed at one end of the swing arm 42 and elastically biasing a slider 44, on which the read/write head may be mounted toward surfaces of the disks 21 and 22, and a voice coil motor (VCM) 45 to rotate the swing arm 42. The VCM 45 may be controlled by a servo control system, and rotate the swing arm 42 in a direction according to Fleming's Left Hand Rule, due to an interaction between current input to a VCM coil and a magnetic field formed by magnets. That is, if the HDD is turned on and the disks 21 and 22 begin to rotate, the VCM 45 may rotate the swing arm 42 in a direction to move the read/write head over recording surfaces of the disks 21 and 22. In contrast, if the HDD is turned off and the disks 21 and 22 stop rotating, the VCM 45 may rotate the swing arm 42 in an opposite direction to remove the read/write head from over the surfaces of the disks 21 and 22.

A cover member 12 may be joined to the base member 11, using a plurality of cover fastening screws 19. Here, a gasket 14 may also be interposed between the base member 11 and the cover member 12 to seal the HDD. The joined base member 11 and cover member 12 surround and protect the disks 21 and 22, the spindle motor 30, the actuator 40, etc., for example.

In this conventional HDD, the rotating disks 21 and 22 may flutter due to structural defects of the spindle motor 30, deflection of the disks 21 and 22 during an assembly process, and turbulent airflow inside the HDD. In particular, non-negligible airflow may be generated around the rapidly rotating disks 21 and 22. The airflow may cause the disks 21 and 22 to vibrate. Once such vibrations of the disks 21 and 22 occur, track mis-registration (TMR) may be caused, thereby increasing position error signals (PESs) and degrading data reproduction and recording performance of the HDD. Particularly, as the data recording densities of disks 21 and 22 have recently been rapidly rising, disk vibration problems have become even worse.

In an attempt to solve these problems, a thin plate-shaped disk damper 60 may be inserted between the disks 21 and 22. If the disk damper 60 is installed between the disks 21 and 22, there remains a narrow space between the disk damper 60 and each of the disks 21 and 22, and thus the disk damper 60 may deaden the vibrations of the disks 21 and 22 due to a damping effect of compressed air between the disks 21 and 22.

However, if an abrupt external impact is applied to the HDD having the disk damper 60 between the disks 21 and 22, the disks 21 and 22 may contact the disk damper 60, thereby damaging the data recording surfaces of the disks 21 and 22. Also, if three or more disks are implemented in the HDD, there is a little room in the HDD interior, and thus, such a disk damper is difficult to install in the HDD.

SUMMARY OF THE INVENTION

Embodiments of the present invention provides a hard disk drive (HDD) including disk spacer that can reduce vibrations of disks of a hard disk drive and a spindle motor assembly having the disk spacer.

To achieve the above and/or other aspects and advantages, embodiments of the present invention include a disk spacer to mount on a spindle motor of a hard disk drive and to support at least one data storage disk, the disk spacer including a ring-shaped spacer body to fit around an outer circumference of a hub of the spindle motor and having at least one surface to contact the at least one disk, a first groove formed on the one surface of the spacer body, a second groove formed on the one surface of the spacer body, extending along inner and outer sides of the first groove, and a damping member to be between the spacer body and the disk to reduce vibrations of the disk, with the damping member seated in the first groove in a normal state and seated in both the first and second groves when compressed against the disk.

The spacer body may include a second surface to contact a second disk, wherein the second surface includes another first groove and another second groove, with another damping member inserted in the other first groove and seated in both the other first groove and the other second groove upon compression of the second surface against the second disk.

The damping member may have a cross-sectional shape complementary to that of the first groove. Further, the damping member may have a substantially circular cross-section shape, and the first groove has a substantially semicircular cross-section shape. Similarly, each of the first groove and the second groove may be ring shaped, and the damping member is ring shaped corresponding to the ring shape of the first groove.

The second groove may have a shallower depth than the first groove. In addition, a volume available in the second groove may be greater than a volume of a portion of the damping member deformed upon compression by the disk. The damping member may be a viscoelastic material. The damping member may further have a compressive strain of 15% or less. The damping member may also be made of rubber or polyurethane.

To achieve the above and/or other aspects and advantages, embodiments of the present invention include a motor assembly, including a spindle motor, at least one data storage disk mounted on the spindle motor, a disk clamp fastened to the spindle motor and fixing the disk to the spindle motor, and at least one disk spacer according to an embodiment of the present invention.

To achieve the above and/or other aspects and advantages, embodiments of the present invention include a hard disk drive including an actuator with a head to record and/or reproduce data from at least one disk mounted with a disk spacer according to an embodiment of the present invention.

To achieve the above and/or other aspects and advantages, embodiments of the present invention include a disk spacer method for mounting a spindle motor in a hard disk drive and for supporting at least one data storage disk, the method including compressing a damping member on a surface of a disk spacer against a surface of a disk, with the damping member seated in single first groove in a normal state and seated in both the first groove and a second grove when compressed against the disk such that the expansion of the damping member into the second groove upon compression reduces vibrations of the disk upon rotation of the disk.

The method may further include compressing another damping member on another surface of the disk spacer against a surface of another disk, with the other damping member seated in another single first groove in a normal state and seated in both the other first groove and another second grove when compressed against the other disk such that the expansion of the other damping member into the other second groove upon compression reduces vibrations of the other disk upon rotation of the other disk.

Accordingly, the vibration of a disk can be effectively reduced by implementing a damping member of a disk spacer, thereby reducing track mis-registration (TMR) and position error signals (PESs).

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
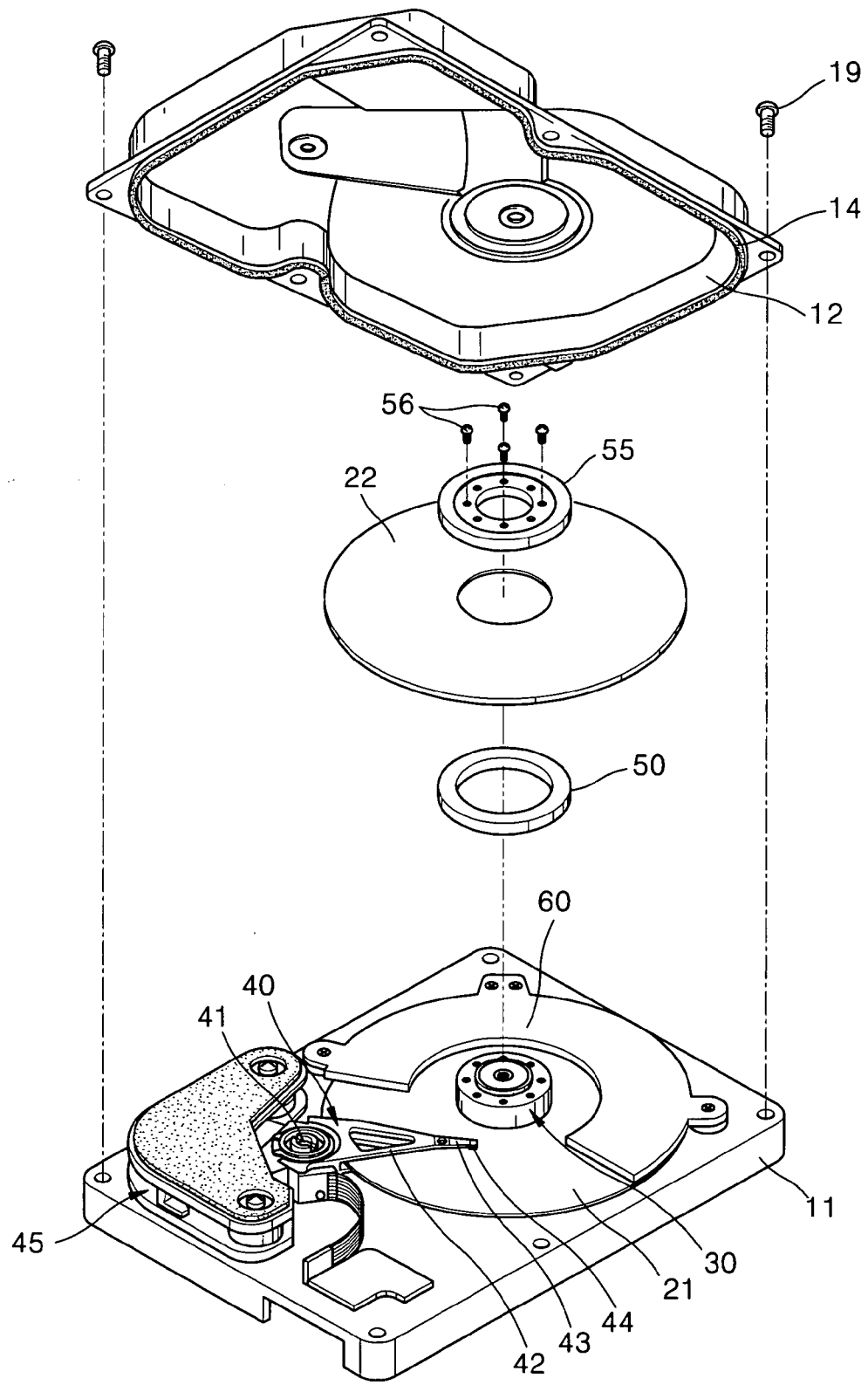
FIG. 1 illustrates a conventional hard disk drive (HDD)
Figure 2:
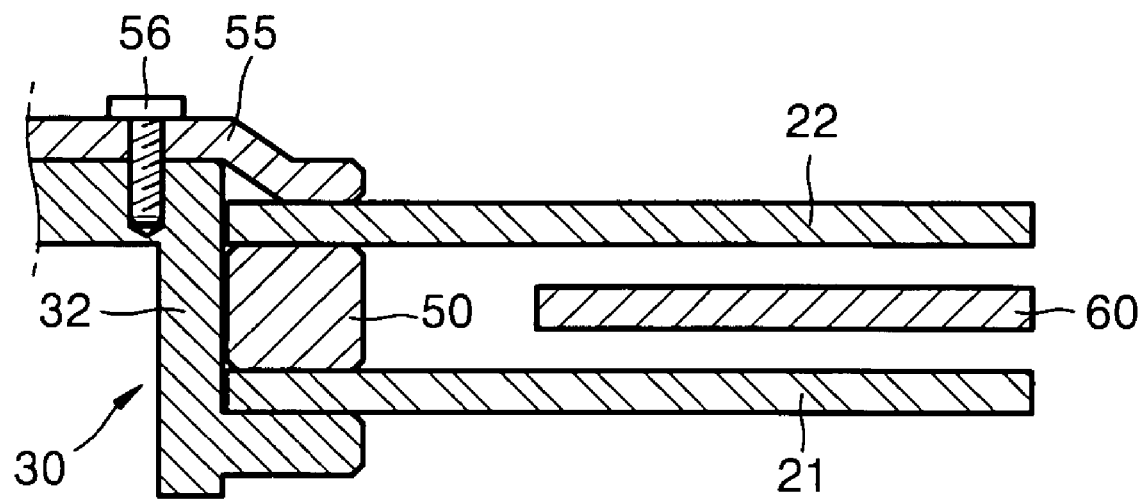
FIG. 2 illustrates a spindle motor, disks, a spacer, and a coupling clamp in a conventional HDD.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 3:
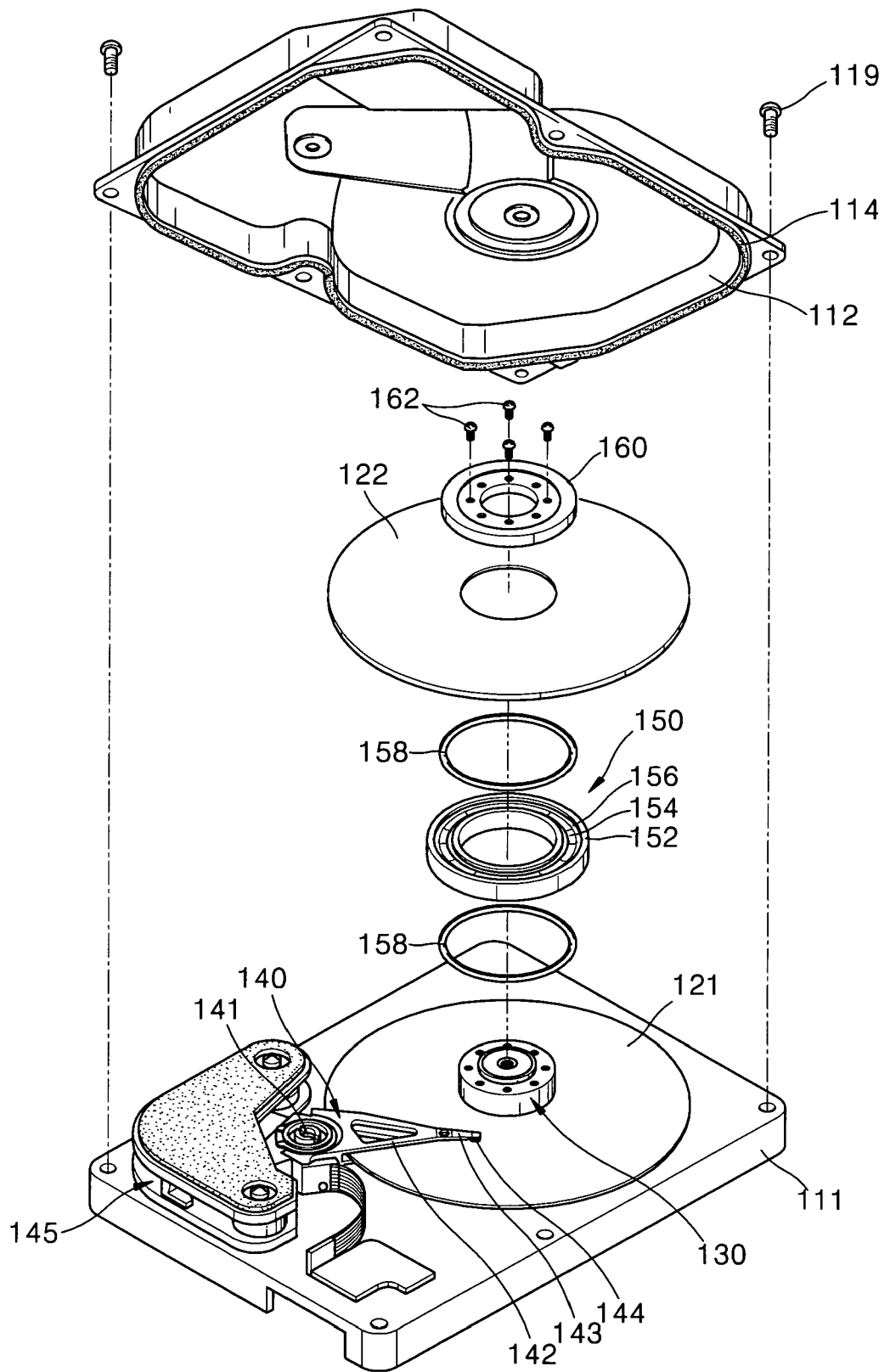
FIG. 3 illustrates a HDD having a disk spacer, according to an embodiment of the present invention.
Figure 4:
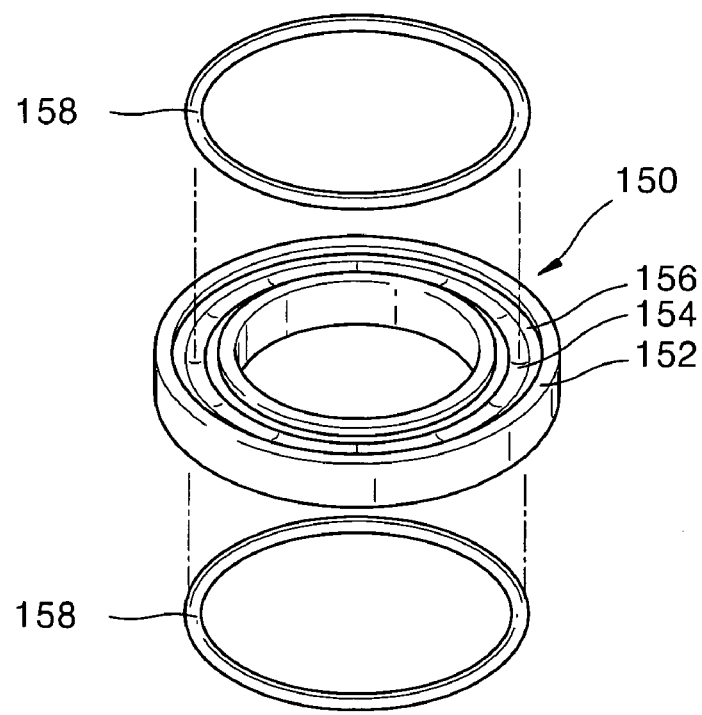
FIG. 4 illustrates an enlarged perspective view of a disk spacer, such as the disk spacer of FIG. 3, according to an embodiment of the present invention.
Figure 5:
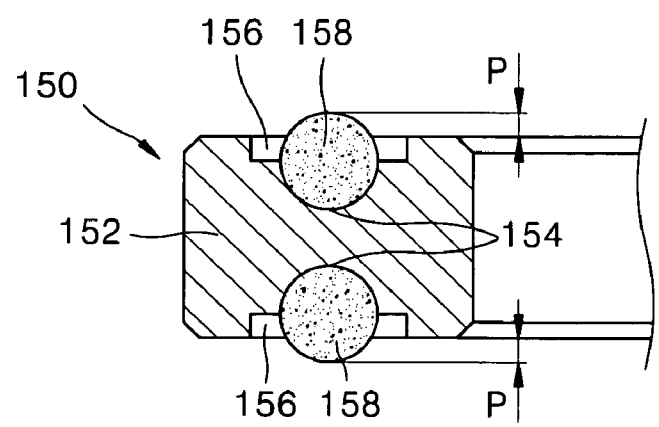
FIG. 5 illustrates another disk spacer, such as that of FIG. 3, according to an embodiment of the present invention.
Figure 6:
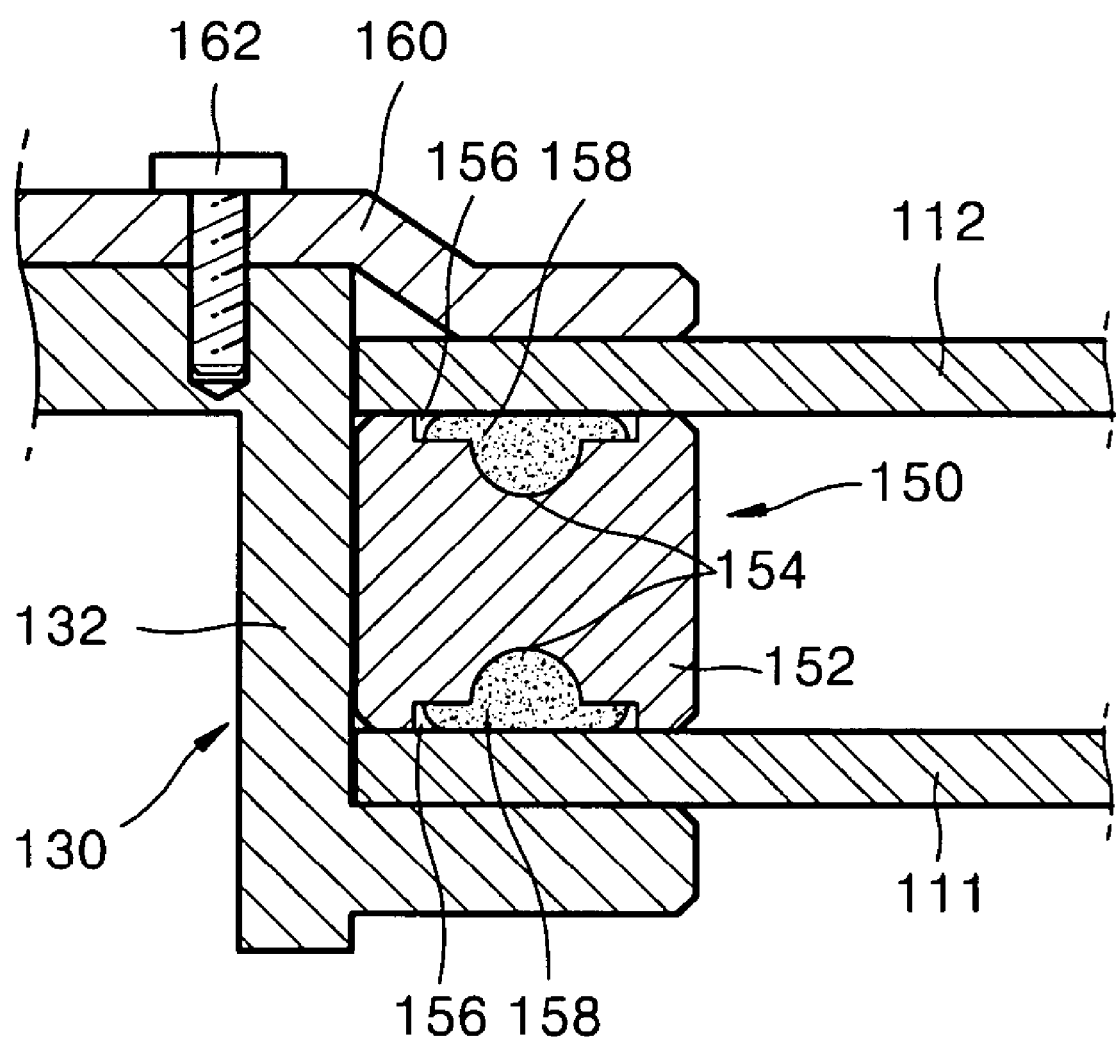
FIG. 6 illustrates a spindle motor assembly having a disk spacer, such as that of FIG. 3, according to an embodiment of the present invention.

FIG. 3 illustrates a hard disk drive (HDD) having a disk spacer, according to an embodiment of the present invention. FIG. 4 illustrates an enlarged perspective view of a disk spacer, FIG. 5 illustrates another disk spacer, and FIG. 6 illustrates a spindle motor assembly having a disk spacer, according to embodiments of the present invention.

Referring to FIGS. 3 through 6, the HDD may include a base member 111, a cover member 112, a spindle motor assembly having one or more disks 121 and 122, which may be data storage media, and an actuator 140.

The base member 111 may typically be made of aluminium or an aluminium alloy, and may be manufactured by die-casting, for example, noting that additional embodiments are equally available. The actuator 140 and the spindle motor assembly, according to an embodiment of the present invention, may be installed on a top surface of the base member 111.

The cover member 112 may be assembled on the base member 111 using a plurality of cover fastening screws 119, and the base member 111 and the cover member 112 may jointly surround and protect the disks 121 and 122, a spindle motor 130, the actuator 140, etc. Here, a gasket 114 may also be disposed between the base member 111 and the cover member 112 to seal the HDD.

The actuator 140 may move a read/write head for data recording and/or reproduction to a predetermined position over the disks 121 and/or 122. The actuator 140 may include a swing arm 142, a suspension 143, and a voice coil motor (VCM) 145, with the swing arm 142 being rotatably coupled to a pivot shaft 141 installed on the base member 111. The suspension 143 may be coupled to a front end of the swing arm 142 and elastically bias a slider 144, on which the read/write head is mounted, toward surfaces of the disks 121 and 122. The VCM 145 may provide torque for rotating the swing arm 142, and may be controlled by a servo control system to rotate the swing arm 142 in a direction according to Fleming's Left Hand Rule, due to the interaction between current input to a VCM coil and a magnetic field formed by magnets. That is, if the HDD is turned on and the disks 121 and 122 begin to rotate, the VCM 145 may rotate the swing arm 142 in one direction to move the read/write head over recording surfaces of the disks 121 and 122. In contrast, if the HDD is turned off and the disks 121 and 122 stop rotating, the VCM 145 may rotate the swing arm 142 in an opposite direction to remove the read/write head from over the disks 121 and 122.

The spindle motor assembly, according to an embodiment of the present invention, may include the spindle motor 130, the disks 121 and 122, a disk clamp 160, and a disk spacer 150. The spindle motor 130, for rotating the disks 121 and 122, may be installed on the base member 111, and include a rotator, e.g., a hub 132. One or more data storage disks, for example, the illustrated two disks 121 and 122, may be fitted around an outer circumference of the hub 132, for example.

The disk clamp 160 may firmly fix the disks 121 and 122 to the hub 132 of the spindle motor 130. The disk clamp 160 may further be coupled to an upper end portion of the spindle motor 130, for example, to an upper end portion of the hub 132, using clamp fastening screws 162, for example, to vertically press the disks 121 and 122.

The disk spacer 150 may be fitted around the outer circumference of the hub 132 of the spindle motor 130 and support the disks 121 and 122. Specifically, when the plurality of disks 121 and 122 are mounted on the hub 132, of the spindle motor 130, as shown in FIG. 3, the disk spacer 150 may be interposed between the disks 121 and 122 to maintain sufficient distance between the disks 121 and 122.

The disk spacer 150, according to an embodiment of the present invention, may not only maintain the distance between the disks 121 and 122 but may also reduce vibrations in the disks 121 and 122. In detail, the disk spacer 150 may include a ring-shaped spacer body 152, a first groove 154 and a second groove 156 formed along top and/or surfaces of the spacer body 152, and a damping member 158 interposed between the spacer body 152 and each of the disks 121 and 122 to reduce the vibrations of the disks 121 and 122, for example.

The spacer body 152 may be fitted around an outer circumference of the hub 132 of the spindle motor 130. Here, the spacer body 152 may have a ring shape, and the top and bottom surfaces of the spacer body 152 may contact the surfaces of the disks 122 and 121, respectively.

The first groove 154 and the second groove 156 may be formed on the surfaces of the spacer body 152, contacting the disks 121 and 122, that is, on the top and bottom surfaces of the spacer body 152. The first groove 154 may be formed to have a predetermined depth, substantially along a central line of each of the top and bottom surfaces of the spacer body 152. The second groove 156 may be formed along both inner and outer, for example, sides of the first groove 154, formed on each of the top and/or bottom surfaces of the spacer body 152. It may be preferable that each of the first groove 154 and the second groove 156 have a ring shape, as only an example.

It may further be preferable that the first groove 154 have a sectional shape complementing that of the damping member 158 (described in greater detail below) so that the first groove 154 can support the damping member 158 more stably. For example, if the damping member 158 has a circular section, it may be preferable that the first groove 154 have a substantially semicircular section to be in close contact with the surface of the damping member 158.

The second groove 156 may be formed to a depth shallower than that of the first groove 154. That is, the first groove 154 and the second groove 156 may be formed to have a 2-stepped pocket shape, for example. The second groove 156 may have a square section.

Thus, the damping member 158 can reduce vibrations of the disks 121 and 122, as described above. In detail, the damping member 158 may be interposed between the spacer body 152 and each of the disks 121 and 122 and may further be compressed and deformed by the disks 121 and 122. Then, the elastic force of the damping member 158 may be applied to the disks 121 and 122, thereby reducing the vibrations of the disks 121 and 122. As only an example, the damping member 158 may be made of viscoelastic material having appropriate viscosity and elasticity. As a further example, the damping member 158 may be made of rubber or polyurethane, and preferably have a compressive strain of 15% or less. If the compressive strain of the damping member 158 is too high or too soft, the elastic force of the damping member may decrease, thereby degrading the effect of damping disk vibrations.

The damping member 158 may be seated in the first groove 154 such that the damping member 158 is supported by the first groove 154. Accordingly, it may be preferable that the damping member 158 have a ring shape, for example, corresponding to the shape of the first groove 154. As described above, the damping member 158 may have a circular section complementary to the section of the first groove 154, noting that additional embodiments are equally available Before the disk spacer 150 and the disks 121 and 122 are assembled, the damping member 158 may maintain its circular shape as shown in FIG. 5. At this time, the damping member 158 may protrude a predetermined height P from each of the top and/or bottom surfaces of the spacer body 152.

Referring to FIG. 6, if the disk spacer 150 and the disks 121 and 122 are assembled together around the outer circumference of the hub 132 of the spindle motor 130, the damping member 158 may be compressed by the disks 121 and 122, and thus a portion of the damping member 158 may be deformed. Thus, the damping member 158 can have an elastic force, due to the deformation, and the generated elastic force may be applied to the disks 121 and/or 122, thereby effectively reducing the vibrations of the disks 121 and 122.

If the deformed portion of the damping member 158 gets in between the lower disk 121 and the bottom surface of the spacer body 152, or between the upper disk 122 and the top surface of the spacer body 152, the distance between the disks 121 and 122 may change. However, according to the present invention, since the deformed portion of the damping member 158 is accommodated in the second groove 156, formed along both sides of the first groove 154, the distance change between the disk and the spacer body 152 may not have occurred. In this regard, it may be preferable that the volume available in the second groove 156 be greater than the volume of the deformed portion of the damping member 158 so that the second groove 156 can sufficiently receive the deformed portion. Accordingly, the top and bottom surfaces of the spacer body 152 may closely contact the disks 121 and 122, and consequently the distance between the disks 121 and 122 may be maintained constant.

In the meantime, a disk spacer according to an embodiment of present invention, may also be applied to an HDD having only one disk. In this case, the disk spacer may be disposed between the disk and the disk clamp, the two grooves may be formed only on the bottom surface of the spacer body, and the damping member may reside in the grooves.

As described above, according to an embodiment of the present invention, since vibrations of disks in a HDD can be effectively reduced by the embodiments including disc spacer damping members, TMR and PESs conventionally, caused by such vibrations of the disks, can be reduced.

Since the aforementioned grooves accommodating the damping member of the disk spacer may be formed to have a 2-stepped pocket shape, the distance between the disks can be maintained constant even though the damping member is compressed and deformed.

In addition to the above, while a HDD has been described as having two disks, embodiments of the present invention are not limited thereto and may be applied equally to a HDD having one disk, or more than two disks. Since embodiments of the present invention do not limit the use of the disk damper, e.g., that shown in FIG. 1, a disk damper may also be used with the disk spacer embodiments of the present invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk spacer to mount on a spindle motor of a hard disk drive and to support at least one data storage disk, the disk spacer comprising:
   a ring-shaped spacer body to fit around an outer circumference of a hub of the spindle motor and having at least one surface to contact the at least one disk;
   a first groove formed on the one surface of the spacer body;
   a second groove formed on the one surface of the spacer body, extending along inner and outer sides of the first groove; and
   a damping member to be between the spacer body and the disk to reduce vibrations of the disk, with the damping member seated in the first groove in a normal state and seated in both the first and second groves when compressed against the disk.

2. The disk spacer of claim 1, wherein the spacer body comprises a second surface to contact a second disk, wherein the second surface comprises another first groove and another second groove, with another damping member inserted in the other first groove and seated in both the other first groove and the other second groove upon compression of the second surface against the second disk.

3. A hard disk drive comprising an actuator with a head to record and/or reproduce data from at least two disks mounted with the disk spacer of claim 2.

4. The disk spacer of claim 1, wherein the damping member has a cross-sectional shape complementary to that of the first groove.

5. The disk spacer of claim 4, wherein the damping member has a substantially circular cross-section shape, and the first groove has a substantially semicircular cross-section shape.

6. The disk spacer of claim 1, wherein each of the first groove and the second groove are ring shaped, and the damping member is ring shaped corresponding to the ring shape of the first groove.

7. The disk spacer of claim 1, wherein the second groove has a shallower depth than the first groove.

8. The disk spacer of claim 1, wherein a volume available in the second groove is greater than a volume of a portion of the damping member deformed upon compression by the disk.

9. The disk spacer of claim 1, wherein the damping member is a viscoelastic material.

10. The disk spacer of claim 9, wherein the damping member has a compressive strain of 15% or less.

11. The disk spacer of claim 9, wherein the damping member is made of rubber or polyurethane.

12. A spindle motor assembly, comprising:
    a spindle motor;
    at least one data storage disk mounted on the spindle motor;
    a disk clamp fastened to the spindle motor and fixing the disk to the spindle motor; and
    at least one disk spacer of claim 1.

13. A hard disk drive comprising an actuator with a head to record and/or reproduce data from at least one disk mounted with the disk spacer of claim 1.

14. A disk spacer method for mounting a spindle motor in a hard disk drive and for supporting at least one data storage disk, the method comprising:
    compressing a damping member on a surface of a disk spacer against a surface of a disk, with the damping member seated in single first groove in a normal state and seated in both the first groove and a second grove when compressed against the disk such that the expansion of the damping member into the second groove upon compression reduces vibrations of the disk upon rotation of the disk.

15. The disk spacer method of claim 14, further comprising compressing another damping member on another surface of the disk spacer against a surface of another disk, with the other damping member seated in another single first groove in a normal state and seated in both the other first groove and another second grove when compressed against the other disk such that the expansion of the other damping member into the other second groove upon compression reduces vibrations of the other disk upon rotation of the other disk.

* * * * *

UNITED STATES PATENT AND TRADEMARK OFFICE
CERTIFICATE OF CORRECTION

PATENT NO. : 7,408,739 B2  Page 1 of 1
APPLICATION NO. : 11/334514
DATED : August 5, 2008
INVENTOR(S) : Kwang-kyu Kim et al.

It is certified that error appears in the above-identified patent and that said Letters Patent is hereby corrected as shown below:

Column 7, Line 21, change "groves" to --grooves--.

Column 8, Line 28, change "grove" to --groove--.

Column 8, Line 38, change "grove" to --groove--.

Signed and Sealed this

Twenty-fifth Day of November, 2008

JON W. DUDAS
*Director of the United States Patent and Trademark Office*